(12) United States Patent
Twogood et al.

(10) Patent No.: US 9,747,479 B2
(45) Date of Patent: Aug. 29, 2017

(54) SMART PASSIVE RFID READER WITH ADAPTIVE BEAMFORMING CAPABILITY

(71) Applicants: Richard Twogood, San Diego, CA (US); Scott Lefton, Melrose, MA (US)

(72) Inventors: Richard Twogood, San Diego, CA (US); Scott Lefton, Melrose, MA (US)

(73) Assignee: Dirac Solutions, Inc., Pleasanton, CA (US)

( * ) Notice: Subject to any disclaimer, the term of this patent is extended or adjusted under 35 U.S.C. 154(b) by 84 days.

(21) Appl. No.: 14/820,278

(22) Filed: Aug. 6, 2015

(65) Prior Publication Data

US 2017/0039405 A1    Feb. 9, 2017

Related U.S. Application Data

(60) Provisional application No. 62/034,179, filed on Aug. 7, 2014.

(51) Int. Cl.

| | |
|---|---|
| *G06K 7/10* | (2006.01) |
| *H01Q 21/29* | (2006.01) |
| *G08B 13/22* | (2006.01) |
| *H01Q 1/08* | (2006.01) |
| *H01Q 3/26* | (2006.01) |
| *H04B 7/024* | (2017.01) |
| *H01Q 1/12* | (2006.01) |
| *H01Q 1/24* | (2006.01) |

(52) U.S. Cl.
CPC ..... *G06K 7/10356* (2013.01); *G06K 7/10089* (2013.01); *H01Q 1/084* (2013.01); *H01Q 1/1235* (2013.01); *H01Q 1/243* (2013.01); *H01Q 3/2623* (2013.01); *H01Q 3/2629* (2013.01); *H01Q 3/2635* (2013.01); *H04B 7/024* (2013.01)

(58) Field of Classification Search
CPC ........ H01Q 1/2216; H01Q 1/42; H01Q 1/523; H01Q 21/24; H01Q 25/00; H01Q 3/02; H01Q 3/04; H01Q 9/16; H01Q 1/084; H01Q 1/1235; H01Q 1/243; H01Q 3/2623; H01Q 3/2629; H01Q 3/2635; G06K 7/0008; G06K 7/10356; G06K 7/10089; G06K 7/10099; H04B 7/024; H04B 7/04
See application file for complete search history.

(56) References Cited

U.S. PATENT DOCUMENTS

| | | | |
|---|---|---|---|
| 7,486,235 B2 * | 2/2009 | Leeper | ..... H01Q 3/02 343/700 MS |
| 7,643,794 B2 | 1/2010 | Ofek | |
| 7,953,372 B2 | 5/2011 | Ofek | |
| 8,204,438 B2 | 6/2012 | Patel | |
| 8,224,253 B2 | 7/2012 | Ofek | |

(Continued)

*Primary Examiner* — Dionne H Pendleton
(74) *Attorney, Agent, or Firm* — Scott Lefton (57) ABSTRACT

A smart passive RFID reader includes an RFID reader, a microcontroller providing a means for increasing the probability of detecting correct passive RFID tags and decreasing the probability of detecting incorrect passive RFID tags, and antennas connected to the RFID reader, wherein adjacent antennas have orthogonal polarization and the antennas each have a pivoting axis, whereby rotating the antennas about their pivoting axes causes a change in the overlap of the antenna beam radiation patterns and thereby provides a means for adaptive beamforming in order to improve tag reading.

26 Claims, 8 Drawing Sheets

(56) References Cited

U.S. PATENT DOCUMENTS

| | | |
|---|---|---|
| 8,743,008 B2 | 6/2014 | Kim |
| 2008/0075021 A1* | 3/2008 | Rofougaran ......... H04B 7/0617 370/277 |
| 2008/0316130 A1* | 12/2008 | Rofougaran ........... H01Q 1/521 343/756 |
| 2012/0306651 A1* | 12/2012 | Hall ................. G08B 13/19673 340/572.1 |
| 2014/0240097 A1 | 8/2014 | Karani |
| 2014/0306852 A1* | 10/2014 | Peterson .............. H01Q 1/2216 343/709 |
| 2016/0268696 A1* | 9/2016 | Hosseini .............. G06K 7/0008 |
| 2017/0177911 A1* | 6/2017 | Sadr ................... G06K 7/10356 |

* cited by examiner

SMART PASSIVE RFID READER WITH ADAPTIVE BEAMFORMING CAPABILITY

RELATED APPLICATIONS

This patent application claims the benefit under 35 USC 119(e) of U.S. Provisional Patent Application No. 62/034,179, filed on Aug. 7, 2014 and entitled "Smart Passive RFID Reader with Adaptive Beamforming Capability", the entirety of which is incorporated herein by reference.

FIELD OF THE INVENTION

This invention relates to readers for passive RFID tags, and more particularly, to standalone portable readers for passive RFID tags, having networking capability, an embedded computing platform, two or more antennas with single or multiple polarization, an emergency battery configured with an uninterruptible power supply (UPS), remote rebooting capability, and adaptive antenna focusing capability.

DESCRIPTION OF THE RELATED ART

Containers of sensitive, valuable and/or dangerous materials such as radioactive and fissile materials must be securely monitored to verify location and also container condition, including unauthorized opening and seal tampering. The use of RFID tags to monitor such containers is well known in the art. A passive RFID tag offers the advantage of not requiring any batteries, receiving electrical energy from the radio signals broadcast by one or more base stations. These base stations are at a distance from the tag, so that the tag may be used in field conditions. The passive RFID tag uses this energy for operations potentially including to receive incoming data, decrypt and process that data, process data such as sensor inputs, and encrypt and transmit outgoing data.

A standard RFID base station contains an RFID reader, but lacks the ability to process the transmitted or received data. Having an RFID base station capable of processing data is critical for use with sophisticated passive tags which may contain sensors and may use encryption for received and transmitted data. The standard RFID base station also lacks any means to steer or optimize the transmitted or received signal, where it would be particularly desirable to perform such steering in a simple and direct way, using commercial off the shelf (COTS) antennas. Phased arrays and other electronic means for antenna steering are well known in the art, but require more expensive and generally purpose-built antennas. Mechanically steerable, orthogonally polarized antennas with the capability to have control over the degree of beam overlap between adjacent antennas could provide a simple means for adaptive beamforming. Incorporating a means for control and computation such as a microcontroller, in combination with means for automated steering of antennas, could provide even more powerful adaptive beamforming capability. Further, the standard RFID base station lacks any sort of generalized internal control system and network capable of passing data between portions of the reader system and performing overall control of reader functions, including interfacing with external user devices and remotely rebooting when necessary. Additionally, the standard RFID base station is dependent on the availability of continuous AC power and is of limited utility in remote locations or in locations that are prone to power outages.

U.S. Pat. No. 8,743,008 entitled Reconfigurable Base Station Antenna teaches an antenna steering mechanism for dual antennas which provides variable overlap for the antenna radiation lobes. However, the '008 patent does not teach any use of orthogonal polarization between the antennas and has no manual adjustment mode. The '008 patent does not provide any power management or networking features.

U.S. Pat. No. 8,224,253 entitled Directional Antenna Sectoring System And Methodology teaches multiple steered antennas with overlapping fields which are actuated by motors or other electromechanical means, potentially for use in an RFID application. However, the goal of the '253 patent is to provide a plurality of distinctly separate communication channels wherein different antenna polarizations are a means for channel separation. Further, the '253 patent does not teach the use of adjacent antennas with orthogonal polarization as a means for variable beamforming for a single channel, or the use of power management including UPS.

U.S. Pat. No. 8,204,438 entitled RFID Tag Reader Utilizing A Scanning Antenna System And Method teaches the use of both vertically polarized and horizontally polarized RF signals. However, the '438 patent does not teach the use of the use of motors or other electromechanical means for steering antennas, nor the use of adjacent antennas with orthogonal polarization as a means for variable beamforming for a single channel, nor the use of power management including UPS.

U.S. Pat. No. 7,643,794 entitled Multi-Sector Antenna Apparatus teaches the use of multiple flat panel antennas attached to a support structure and a mechanical means to change the angles between the antennas. However, the '794 patent also teaches an antenna control unit selecting specific antenna sectors for transmitting multiple data packets, rather than providing adjacent antennas with orthogonal polarization as a means for variable beamforming for a single channel. Further, the '794 patent does not teach the use of power management including UPS.

U.S. Patent Application No. 20140240097 entitled Methods and Apparatus For Ceiling-Mounted RFID-Enabled Tracking teaches the use of mechanically actuated articulating brackets configured to move antennas into a plurality of positions in order to receive an RFID signal and track a subject. However, the '097 application does not teach the use of specifically selected antenna polarization, combined with the antennas being mechanically steered, in order to provide a means for variable beamforming. Further, the '097 application does not teach the use of power management including UPS.

A RFID reader with greater utility would provide the ability to operate as a standalone portable reader for passive tags, having networking capability, an embedded computing platform, two or more antennas with preferably orthogonal polarization, mechanically actuated antenna focusing capability, power management including an emergency battery configured with a UPS controller, and remote rebooting capability.

SUMMARY OF THE INVENTION

A smart passive RFID reader comprises a means for powering the smart passive RFID reader, the means for powering selected from the group consisting of an AC power input, at least one DC voltage converter, at least one DC-DC converter, at least one UPS controller, and at least one battery, an RFID reader configured to send and receive signals from passive RFID tags, a plurality of antennas in electrical communication with the RFID reader, wherein the antennas each have a primary antenna plane, wherein the antennas each have a pivoting axis proximate the antenna and substantially parallel to the antenna plane, wherein at least two of the antennas are adjacent with the pivoting axes being parallel, and with the adjacent antennas having orthogonal polarization with respect to one another, and with the adjacent antennas each having a beam radiation pattern, and whereby rotating the antennas about the pivoting axes causes a change in the overlap of the beam radiation patterns, and thereby provides a means for adaptive beamforming in order to improve tag reading.

Further, each pivoting axis is proximate one edge of the associated antenna, and the pivoting axes are in mutual proximity. Each of the pivoting axes has a pivot angle range of approximately 0 to 15 degrees.

The smart passive RFID reader further comprises a plurality of antenna mounting frames with each of the antennas being fastened to one of the antenna mounting frames, a substrate frame with each of the pivoting axes being fastened between the antenna mounting frames and the substrate frame, whereby the antennas may be rotated to be parallel to the substrate frame or rotated to be angled relative to each other and to the substrate frame.

Yet further, the means for powering includes an AC power inlet, at least one DC voltage converter, at least one backup battery, and at least one UPS controller, wherein the DC voltage converter is in electrical communication with the AC power inlet, the DC voltage converter is also in electrical communication with the UPS controller, the backup battery is in electrical communication with the UPS controller, and the RFID reader is in electrical communication with the UPS controller. The means for powering further includes a mode switch having a first, a second, and a third mode, wherein the first mode powers the smart passive RFID reader exclusively from the DC voltage converter and the AC power inlet, the second mode powers the smart passive RFID reader from the DC voltage converter and the AC power inlet with UPS-controlled battery backup in the event of the loss of AC power, the second mode further provides recharging to the battery, and the third mode powers the smart passive RFID reader exclusively from the battery.

The smart passive RFID reader yet further comprises a microcontroller which provides functions selected from the group consisting of an embedded computing platform within the smart passive RFID reader, parsing RFID reader tag detection messages, encrypted transmission of data, decryption of received data, encrypted authentication of tag messages, signal processing, database integration, networking capability on RFID reader data, user interface, and diagnostics messages, wherein the microcontroller thereby provides a means for increasing the probability of detecting correct passive RFID tags and decreasing the probability of detecting incorrect passive RFID tags.

The smart passive RFID reader still further comprises an internal network including at least one Ethernet switch having a plurality of Ethernet ports, with the internal network providing high-level data connectivity between the microcontroller, the RFID reader module, and user devices external to the smart passive RFID reader. Connected to the internal network is a network reboot controller configured to accept reboot commands from user devices external to the smart passive RFID reader and perform power-cycling rebooting upon the microcontroller and the RFID reader. There is also an Ethernet jack configured for connection to user devices external to the smart passive RFID reader. The at least one Ethernet switch may comprise at least a first Ethernet switch and a second Ethernet switch, wherein the first Ethernet switch is connected to the network reboot controller, the second Ethernet switch, and the Ethernet jack, and wherein the second Ethernet switch is connected to the first Ethernet switch, the RFID reader, and the microcontroller and wherein the network reboot controller is additionally configured to perform power-cycle rebooting upon the second Ethernet switch. There is also a USB jack and an HDMI jack configured for connection to user devices external to the smart passive RFID reader, wherein the USB jack and the HDMI jack are connected to the microcontroller.

The smart passive RFID reader additionally comprises an enclosure at least partially enclosing the antennas, the antenna frames, and the substrate frame, and may enclose the means for powering and the RFID reader.

The smart passive RFID reader yet additionally comprises a plurality of mechanical linkages, each being operatively engaged between a portion of one of the antenna frames and a portion of the enclosure, wherein the mechanical linkages each include a means for locking, are manually actuatable, and whereby each of the antennas may be rotated or locked in position by manually actuating the operatively engaged one of the mechanical linkages.

The smart passive RFID reader may still additionally comprise a plurality of electromechanical actuators, each operatively engaged with one of the antennas, a microcontroller which provides functions selected from the group consisting of an embedded computing platform within the smart passive RFID reader, parsing RFID reader tag detection messages, encrypted transmission of data, decryption of received data, encrypted authentication of tag messages, signal processing, database integration, networking capability on RFID reader data, user interface, actuator control, and diagnostics messages, wherein the microcontroller thereby provides a means for increasing the probability of detecting correct passive RFID tags and decreasing the probability of detecting incorrect passive RFID tags, and wherein the actuators are in electronic communication with and under control of the microcontroller, and whereby each of the antennas may be rotated to or held in a specific angular position by one of the actuators.

OBJECTS AND FEATURES OF THE INVENTION

It is an object of the present invention to provide a smart passive RFID reader with variable beamforming to improve tag reading.

It is another object of the present invention to provide a smart passive RFID reader with adaptive beamforming to improve tag reading.

It is yet another object of the present invention to provide power management including a battery backup and uninterruptible power supply.

It is still another object of the present invention to provide high-level internal control over RFID reader system functions.

It is a further object of the present invention to provide an internal network to facilitate internal control and to provide communication with external user devices.

It is a feature of the present invention to provide mechanically steerable, orthogonally polarized antennas.

It is another feature of the present invention to provide AC-only, UPS, and battery-only modes of system power.

It is yet another feature of the present invention to provide a microcontroller for system control.

It is still another feature of the present invention to provide signal processing to increase the probability of correct tag detection and decrease the probability of tag detection false alarms.

It is a further feature of the present invention to provide an Ethernet-based internal network.

It is a yet further feature of the present invention to provide a network reboot controller.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE PREFERRED EMBODIMENTS

Figure 1:
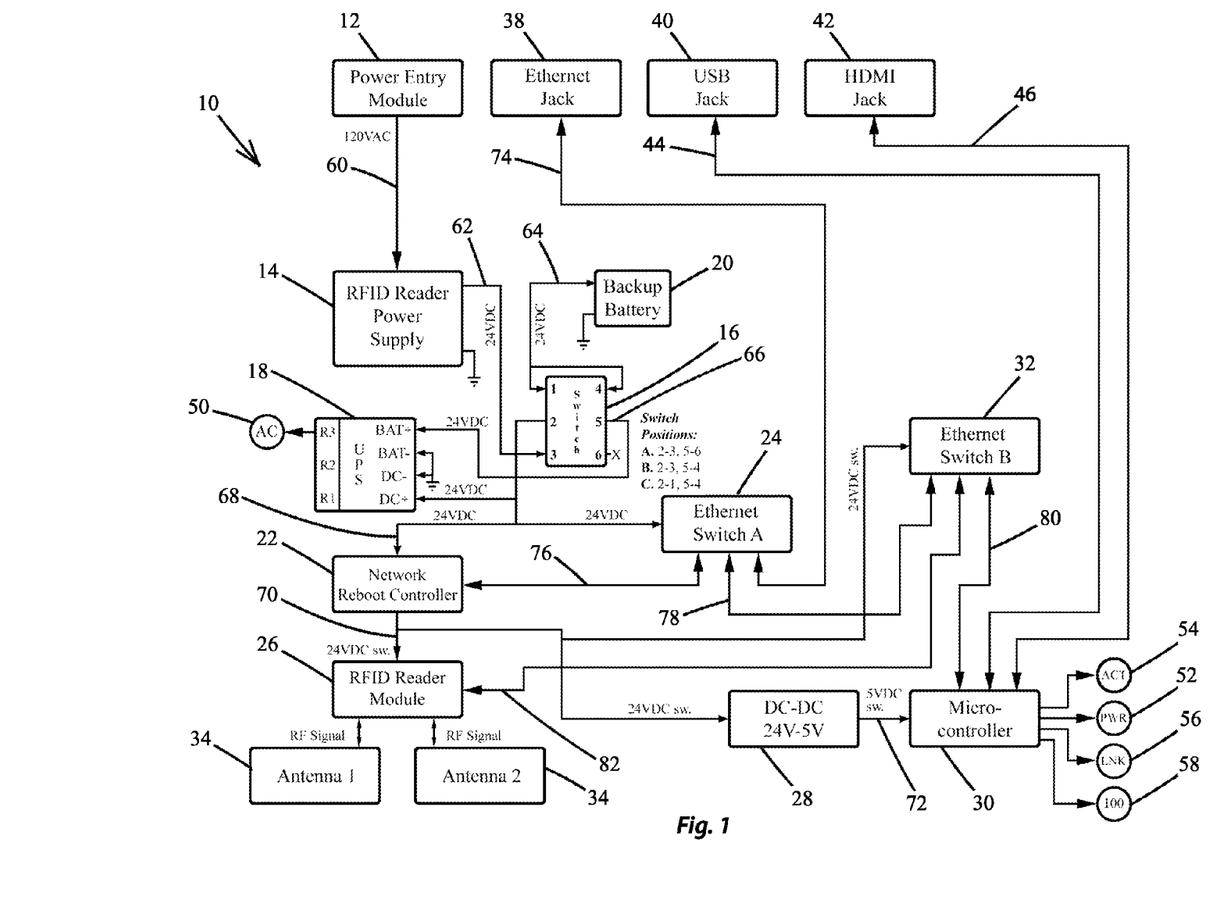
FIG. 1 shows a first embodiment block diagram for a smart passive RFID reader.

FIG. 1 shows a block diagram of a first embodiment of the smart passive RFID reader 10. The means for powering the smart passive RFID reader 10 preferably comprises: AC power input through the power entry module 12, which may be simply a power cord and power cord inlet, or may include components such as fuses, AC power switches, power indicators, and surge protectors. The AC power is connected by an internal AC cable 60 from the power entry module 12 to the RFID reader power supply 14 which serves as a DC voltage converter and provides direct 24 VDC preferably through the power supply output cable 62 to a power selector mode switch 16. The output of the power selector mode switch 16 is fed from the primary 24 VDC cable 68 to the DC input of the uninterruptible power supply (UPS) controller 18. The power indicator 50 is switched on by a relay in the UPS controller 18, but may also indicate power by being attached to other portions of the 24 VDC wiring. The backup battery 20 provides 24 VDC battery input to the power selector switch 16 through the primary battery cable 64, with the switched battery output cable 66 connected from the power selector switch 16 to the battery input of the UPS controller 18. The DC and Battery grounds of the UPS controller 18 are commonly connected, and are also common to the AC ground.

The power selector mode switch 16 preferably provides three modes of operation: Mode A provides exclusively AC input with no use of the backup battery 20 or UPS controller 18; Mode B provides full UPS function wherein loss of AC power will cause the UPS controller 18 to instantly switch over to backup battery 20 operation and during AC powered operation uses the UPS controller 18 to maintain charge on the backup battery 20; Mode C provides exclusively backup battery 20 operation. The primary 24 VDC cable 68 also provides power directly to the network reboot controller 22 and a first Ethernet switch 24. The network reboot controller 22 provides switched 24 VDC output through the switched 24 VDC cable 70 to power the RFID reader 26, a DC-DC converter 28 to power the microcontroller 30, and a second Ethernet switch 32. The network reboot controller 22 defaults to acting as a normally closed switch, therefore allowing the RFID reader 26, the DC-DC converter 28, and the second Ethernet switch 32 to normally be in electrical communication with the UPS controller 18. The DC-DC converter 28 provides power to the microcontroller 30 through the microcontroller power cable 72. There are preferably two antennas 34 connected to the RFID reader 26. The first and unswitched Ethernet switch 24 is connected to an Ethernet jack 38 through a first Ethernet cable 74, to the network reboot controller 22 through a second Ethernet cable 76, and to the second and switched Ethernet switch 32 through a third Ethernet cable 78. The second Ethernet switch 32 is also connected to the microcontroller 30 through a fourth Ethernet cable 80, and to the RFID reader 26 through a fifth Ethernet cable 82. The first Ethernet switch 24 and second Ethernet switch 32 thus provide a plurality of Ethernet ports for an internal network which provides high-level data connectivity between the microcontroller 30, the RFID reader 26, and user devices external to the smart passive RFID reader 10. The smart RFID reader 10 also preferably includes a USB jack 40 and an HDMI jack 42 which are both connected to the microcontroller 30, through a USB cable 44 and an HDMI cable 46 respectively. The Ethernet jack 38, the USB jack 40, and the HDMI jack 42 are all configured for connection to external user devices.

The UPS configuration allows the smart passive RFID reader 10 to function in standalone and portable modes, both in planned and in emergency operation, while communicating with passive RFID tags. The Network Reboot Controller 22 enables the smart passive RFID reader 10 to be reset remotely if a network problem occurs, power cycling the RFID reader 26, the microcontroller 30, and the second Ethernet switch 32 without requiring a person to visit the site where the system is situated. The split unswitched/switched DC voltage configuration assures that the first Ethernet switch 24 is continuously powered, even when the Network Reboot Controller 22 cycles. The Network Reboot Controller 22 is preferably accessed via a communication means such as Ethernet. Other communication protocols are seen as being within the scope of the invention, but Ethernet is used to provide system and external networking capability in the preferred embodiment. The selection of 24 VDC is based primarily on the required supply voltage for the RFID Reader 26; if the RFID Reader 26 required a supply voltage other than 24 VDC, then the system DC voltage would be other than the 24 VDC disclosed hereinabove and appropriate DC-DC converters would be employed as needed. The RFID Reader 26 transmits and receives radio frequency signals through two antennas 34, which preferably have orthogonal polarization. Preferably, the polarizations are linear with one antenna 34 having horizontal polarization and one antenna 34 having vertical polarization. Optionally, more or fewer antennas 34 could be used, but two antennas 34 are used in the preferred embodiment.

The switched 24 VDC provided by the Network Reboot Controller also powers the DC-DC converter 28 which provides 5 VDC to the microcontroller 30. If the microcontroller 30 chosen were to operate from a voltage other than 5 VDC, then the appropriate voltage converter would be selected herein. The microcontroller 30 communicates with the second Ethernet Switch 32, plus a USB jack 40 and an HDMI jack 42 for external data input and output, and for system control. The first Ethernet Switch 24 communicates with the Ethernet jack 38 for external data input and output, and for system control through external user devices.

The microcontroller 30 functions as an embedded computing platform within the smart passive RFID reader 10, and the software loaded into the microcontroller 30 interfaces with the RFID reader 26, parses tag detection messages, and may encrypt transmitted data, decrypt received data, and perform encrypted authentication of tag messages. Within the geographic range of potential tag detection there may be passive RFID tags other than the passive RFID tags which are the desired targets of the smart passive RFID reader 10, or passive RFID tags that have been tampered with. It is critical that the smart passive RFID reader 10 be able to quickly and with high probability authenticate the correct tags, while rejecting incorrect tags. The use of a microcontroller capable of running very high caliber encrypted authentication algorithms improves the ability of the smart passive RFID reader 10 to detect the correct tags while decreasing the probability of false alarms from detecting incorrect tags. While a microcontroller 30 is a preferred means of providing embedded computing, any small computing device capable of providing embedded computing and running the necessary encrypted authentication algorithms can be utilized in the smart passive RFID reader 10 within the scope of the present invention. The microcontroller 30 also provides signal processing, database integration and networking capability on RFID reader 26 data, and also provides user interface and diagnostics messages. The USB jack 40, HDMI jack 42, and Ethernet jack 38 also serve as ports for peripherals and user accessories such as monitors, WIFI, keyboard, and mouse. These ports can also be used to load code into the microcontroller 30. The four microcontroller 30 status indicators are the power indicator 52, the SD card activity indicator 54, the Ethernet link indicator 56, and the Ethernet 100 MBPS indicator 58.

The network reboot controller 22 is an Ethernet-controlled device that contains a normally closed switch or relay, which can open a circuit on command. A preferred example of a network reboot controller 22 is the iBoot-DC, manufactured by Dataprobe Inc. Using the network reboot controller 22 to power cycle the RFID reader 26, the microcontroller 30 and the second Ethernet switch 32, provides the capability to remotely reboot system operation through external user devices if a software issue or other operational issue makes the control portion of the smart passive RFID reader 10 unresponsive.

Figure 2:
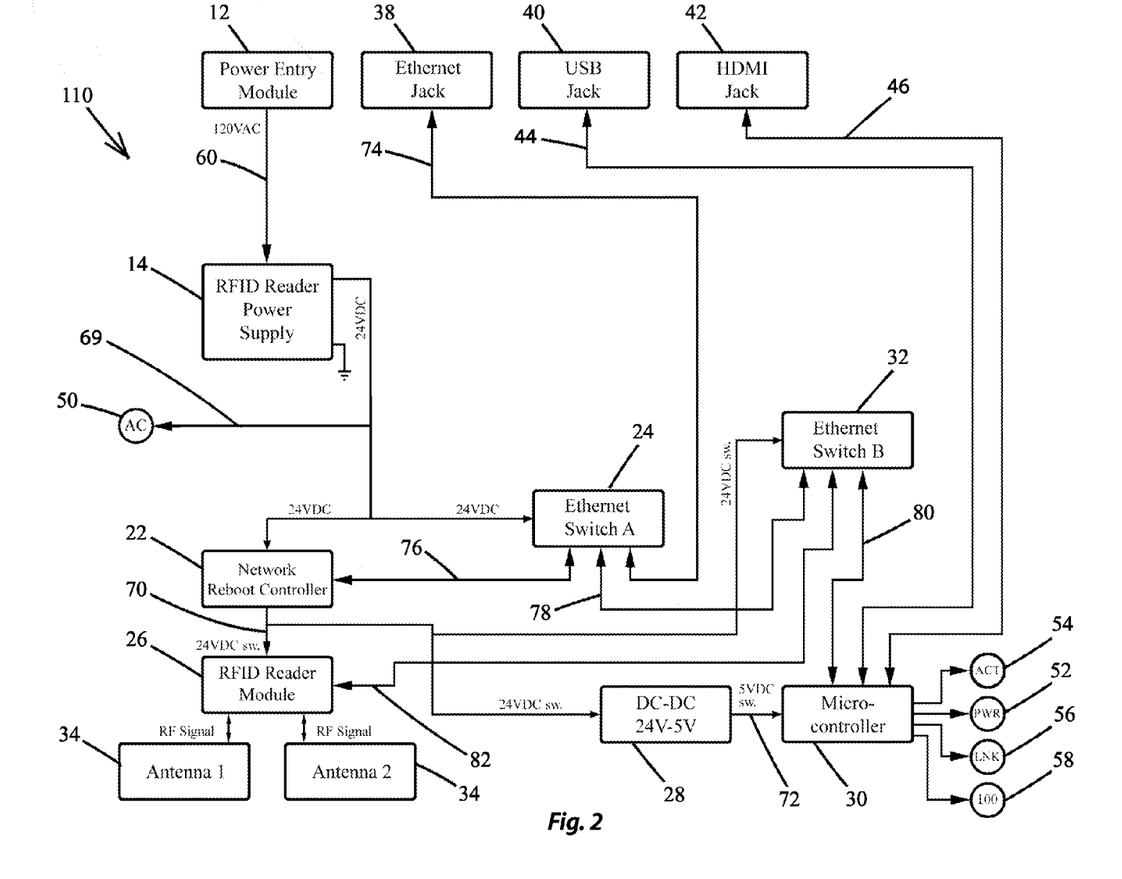
FIG. 2 shows a second embodiment block diagram for a smart passive RFID reader.

FIG. 2 shows the block diagram of a second embodiment of the smart passive RFID reader 110, which is realized without a battery or UPS in order to achieve a significant weight savings. AC power is input through the power entry module 12, which may be simply a power cord and power cord inlet, or may include components such as fuses, AC power switches, power indicators, and surge protectors. The AC power is connected by an internal AC cable 60 from the power entry module 12 to the RFID reader power supply 14 which provides unswitched 24 VDC preferably through the power supply output cable 69 to the network reboot controller 22 and a first Ethernet switch 24. The network reboot controller 22 provides switched 24 VDC output through the switched 24 VDC cable 70 to power the RFID reader 26, a DC-DC converter 28 to power the microcontroller 30, and a second Ethernet switch 32. The DC-DC converter 28 provides power to the microcontroller 30 through the microcontroller power cable 72. There are preferably two antennas 34 connected to the RFID reader 26. The first and unswitched Ethernet switch 24 is connected to an Ethernet jack 38 through a first Ethernet cable 74, to the network reboot controller 22 through a second Ethernet cable 76, and to the second and switched Ethernet switch 32 through a third Ethernet cable 78. The second Ethernet switch 32 is also connected to the microcontroller 30 through a fourth Ethernet cable 80, and to the RFID reader 26 through a fifth Ethernet cable 82. The smart RFID reader 10 also preferably includes a USB jack 40 and an HDMI jack 42 which are both connected to the microcontroller 30, through a USB cable 44 and an HDMI cable 46, respectively. All other functions of the second embodiment smart passive RFID reader 110 are identical to the functions of the smart passive RFID reader 10.

FIGS. 3-6 show the main mechanical structure of the smart passive RFID reader 10. An enclosure 84 provides a frame around the antennas 34, wherein each antenna 34 is fastened to an antenna mounting frame 94. The antennas 34 are preferably adjacent each other. The antenna mounting frames 94 are each fastened to hinges 88 which serve as pivoting axes and are also fastened to a substrate frame 96 which is fastened within the body of the enclosure 84, wherein the hinges 88 are fastened as shown in mutual proximity to each other and to the edges of the antenna mounting frames 94. While hinges 88 are utilized as pivoting axes in this embodiment of the present invention, it is within the scope of the present invention for any other rotatable means to be employed in order to achieve the same mechanical function. Thus as shown, each antenna 34 has a pivoting axis proximate the antenna 34 and substantially parallel to the antenna 34 plane. In the preferred embodiment, the pivoting axis is proximate the edge of the antenna 34 nearest the edge of the neighboring antenna 34, and thereby the pivoting axes are preferably parallel. Vent slots 86 are provided in the top, bottom and sides of the enclosure 84. The power entry module 12, the mode switch 16, and all of the jacks and indicators are shown on the right side of the enclosure 84, but it is within the scope of the present invention to have these features on any portion of the enclosure. The back panel 98 of the enclosure 84 includes a VESA-compatible mounting bracket 48 which may be used when the smart passive RFID reader 10 must be mounted to a wall, pole, or any other substantially vertical surface. In the preferred embodiment of the present invention, the electronic components other than the antennas 34 are fastened to the enclosure 84, the substrate frame 96, or the back panel 98.

The RFID reader 26 is preferably a multi-channel, integrated reader such as the Speedway Revolution series of readers manufactured by Impinj. The functionality of the RFID reader 26 includes both the sending of signals to passive RFID tags and the receiving of signals from passive RFID tags. This functionality is well known in the art for RFID readers. The antennas 34 are preferably directional flat panel antennas, such as the MT-263003/N model manufactured by MTI Wireless Edge. This flat panel antenna 34 has a primary antenna plane and as packaged measures approximately 1 foot.times.1 foot in area. This antenna 34 is linearly polarized, and the polarization may be oriented either vertically or horizontally. In the present invention, one antenna 34 is oriented vertically and the other antenna 34 is oriented horizontally, thereby providing orthogonal polarization. Each antenna 34 has a beam radiation pattern controlled by the polarization. The use of orthogonal polarization of adjacent antennas 34 combined with antenna steering causes a change in the overlap of the beam radiation patterns, thus causing a change in the additive nature of the beam radiation patterns, this change being both qualitative and directional, which thus provides a means for variable, adaptive beamforming. Steering the antennas results in changes to the received intensity of the passive RFID tag signal, thus providing the data needed to determine tag direction for optimized signal transmission and reception. Further combined with the smart passive RFID reader 10 using adaptive beamforming is the use of a microcontroller 30 running at least one very high caliber encrypted authentication algorithm, thereby improving the probability of the smart passive RFID reader detecting the correct passive RFID tags while decreasing the probability of false alarms from detecting incorrect passive RFID tags within the antenna radiation pattern.

Figure 3:
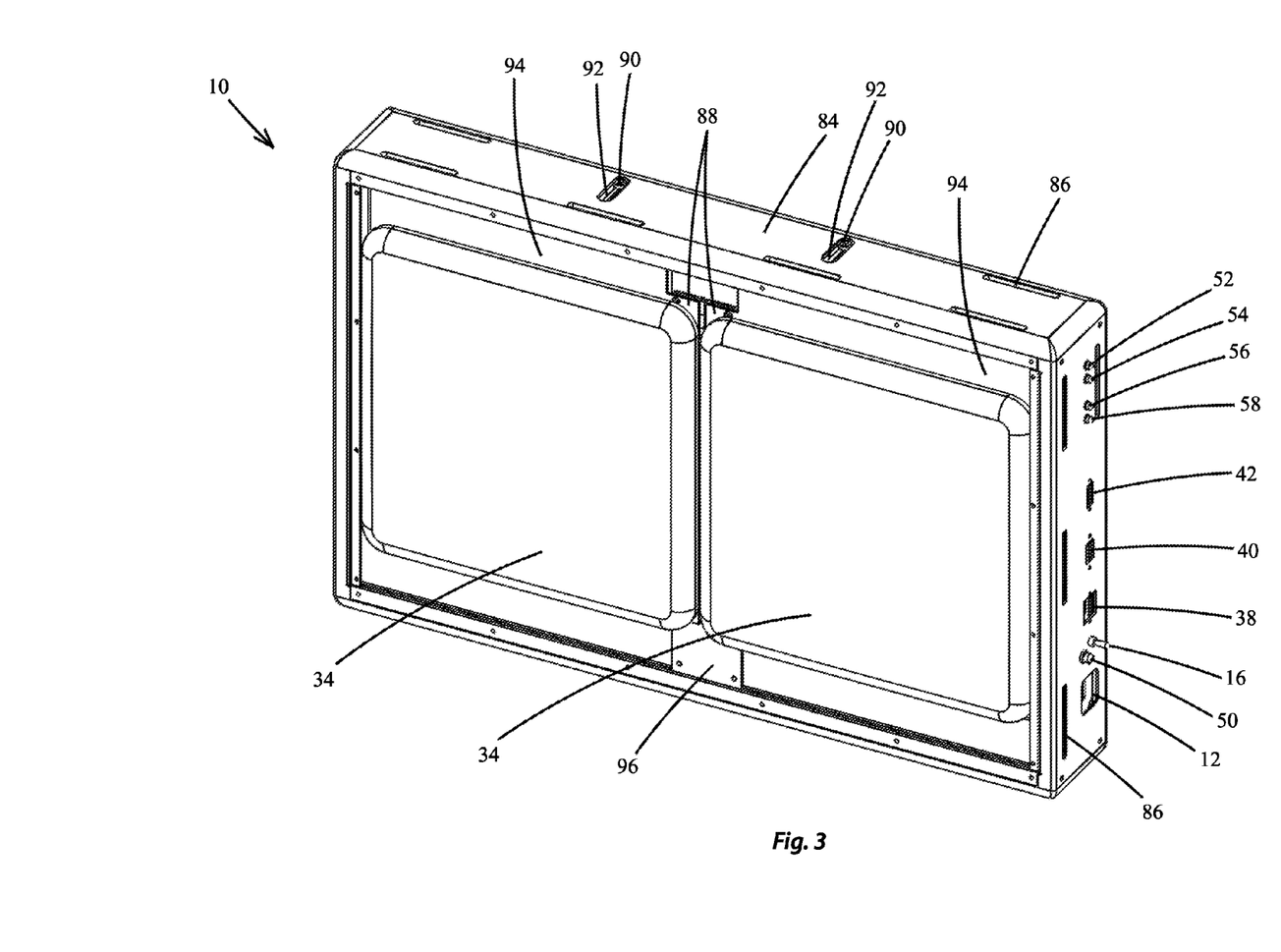
FIG. 3 shows a perspective view of the smart passive RFID reader with the antennas laying flat.
Figure 4:
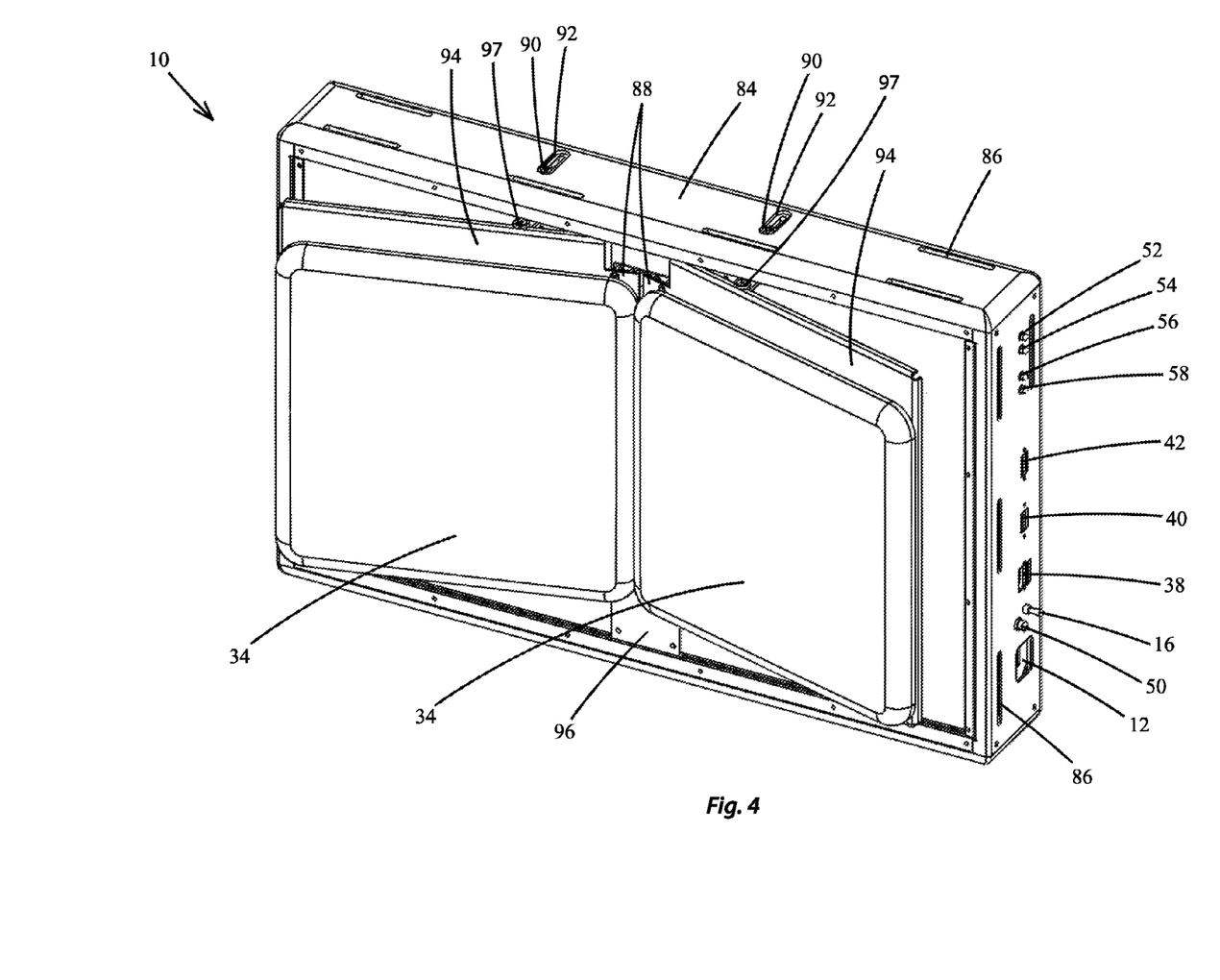
FIG. 4 shows a perspective view of the smart passive RFID reader with the antennas at full angular extension.
Figure 5:
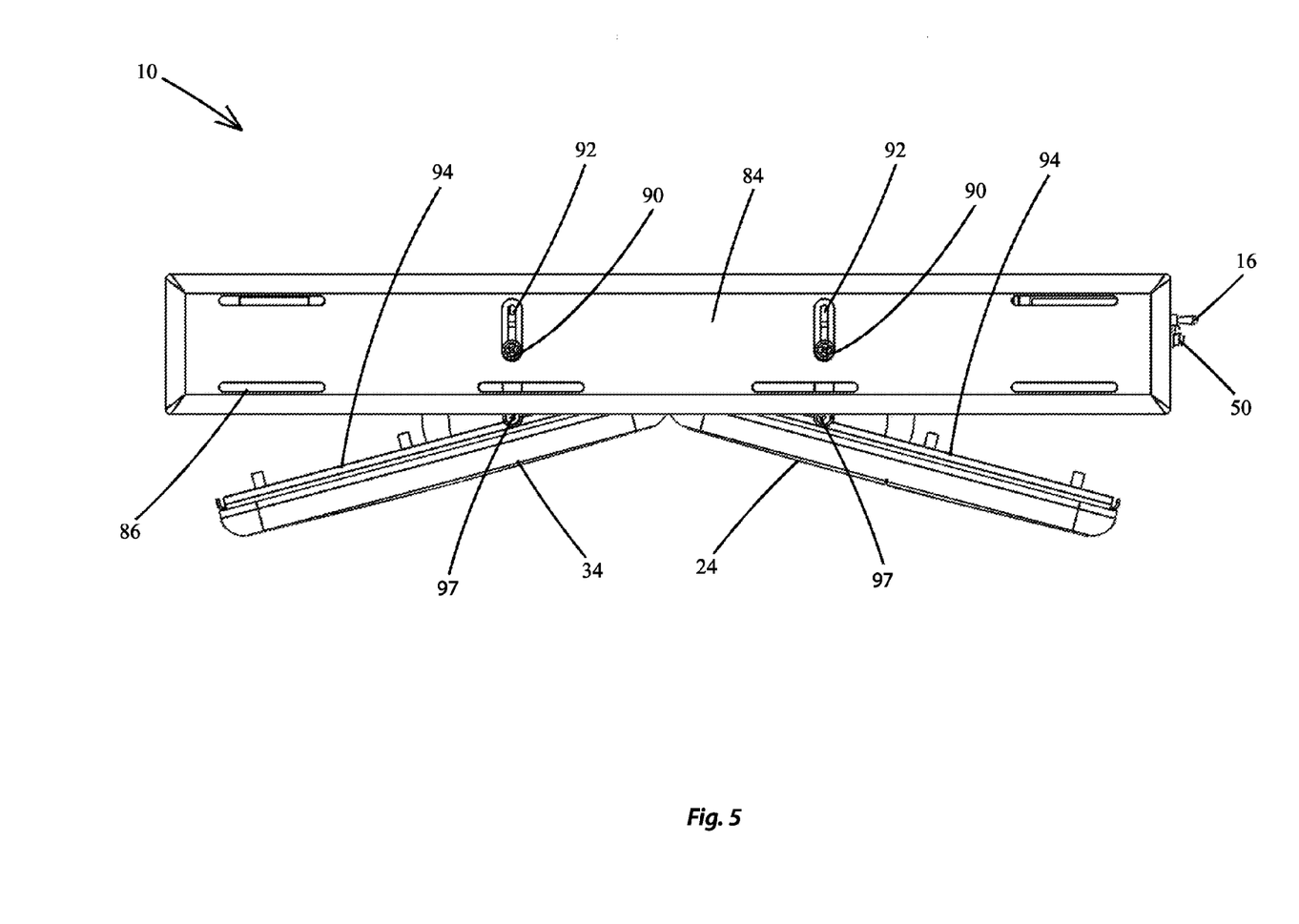
FIG. 5 shows a plan view of the smart passive RFID reader with the antennas at full angular extension.
Figure 6:
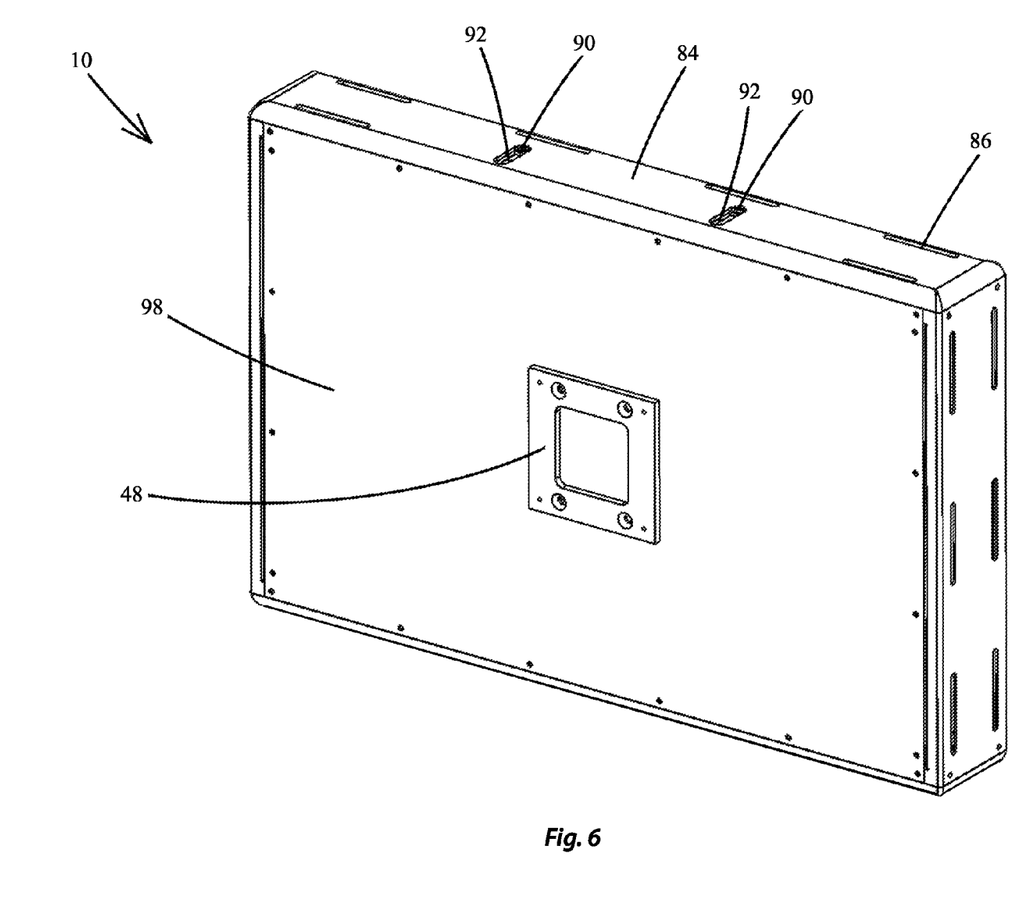
FIG. 6 shows a perspective view of the back of the smart passive RFID reader.
Figure 7:
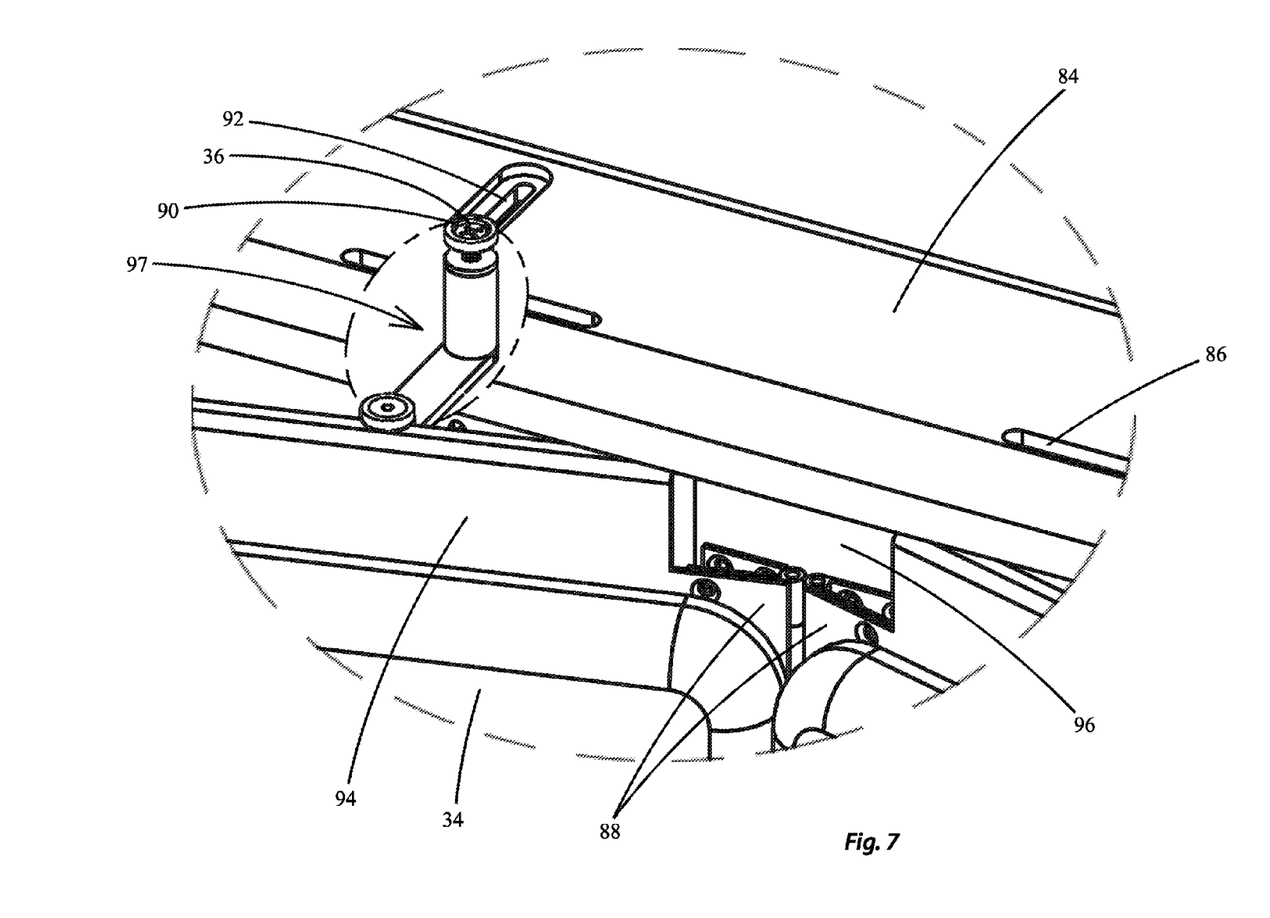
FIG. 7 shows a partial cutaway view of the crank arm mechanism.

Each antenna 34 may be moved anywhere between a retracted position and an extended position, where FIG. 3 shows the retracted position and FIGS. 4-5 show the extended position. In the preferred embodiment, the retracted position has the antennas 34 parallel each other and to the substrate frame 96, which can be seen as an angle of zero degrees. In the preferred embodiment, the extended position has each antenna 34 at an angle of approximately 15 degrees from the substrate frame 96. It is within the scope of the present invention for the angles between each of the antennas 34 and the substrate frame to be greater than 15 degrees at full extension, and negative (rotated back beyond parallel with the substrate frame 96) at full refraction. The antennas 34 are each capable of independent motion over the angular range. In the preferred embodiment as shown in FIG. 7, each antenna mounting frame 94 and thus each antenna 34 is operatively engaged through a movable mechanical linkage to a slide knob 90 which travels in a slide channel 92. In the present invention the linkage is a simple crank arm 97, but those skilled in the art can see that a wide variety of linkage mechanisms may be employed to provide the mechanical operation of the present invention. The slide knob 90 is preferably able to lock to hold the crank arm 97 at any point along the slide knob 90 travel, and when unlocked may be manually slid to change the angle of the antenna through consequent movement of the crank arm 97. In the preferred embodiment of the manually actuatable linkage mechanism, the locking means is a locking screw 36.

Figure 8:
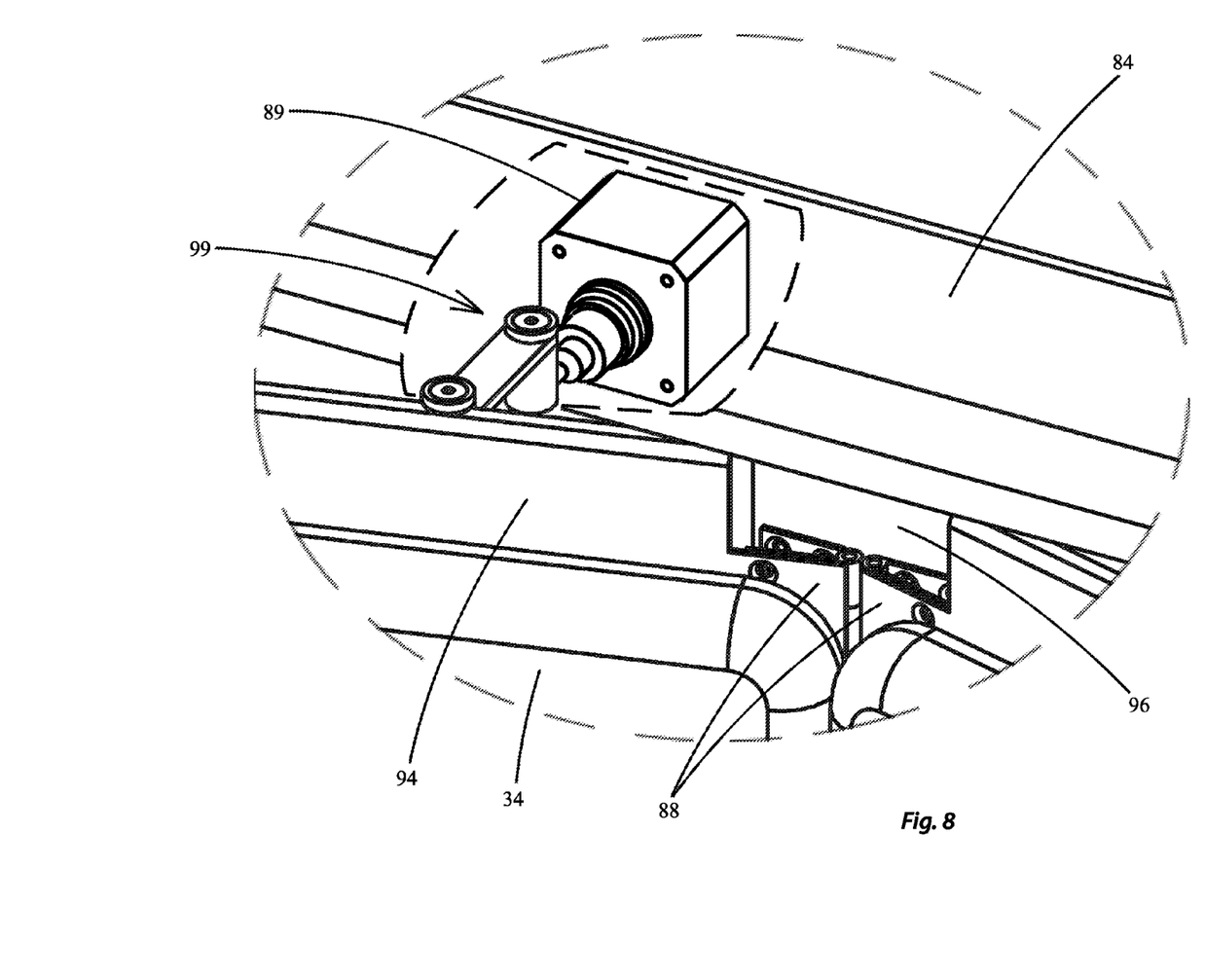
FIG. 8 shows a partial cutaway view of the actuator and actuator crank arm mechanism.

The smart passive RFID reader 10 may also utilize one or more electromechanical actuators to rotate or hold each of the antennas 34 to a desired angular position. FIG. 8 shows an actuator 89 with a motor and a central lead screw to provide linear motion, plus an actuator crank arm 99 linkage mechanism for providing steering to the antenna 34 through a movable linkage connected between the actuator 89 and the antenna frame 94. Preferably one actuator 89 is used per antenna 34. The actuators 89 may be of types including stepper motors, servo motors, solenoids or any other electrically controlled device capable of providing a precise displacement. The actuators 89 may include gearing, rotary-to-linear motion, or any other means of transferring mechanical forces and movements as a means for steering the antenna 34. The means of actuator 89 control includes manually operated input devices including switches and potentiometers, or electronic control through the internal network including from external user devices, or control directly from electronic communication with the microcontroller 30, or any combination of control means. Such means of actuator 89 control, particularly incorporating the microcontroller 30, may also involve position feedback and may use data derived from received RFID signals in order to provide adaptive antenna 34 steering. Those skilled in the art will understand that actuator 89 and any associated linkage mechanism may realize position feedback using potentiometers, LVDTs, or any other electronic or electromechanical means for sensing position. By utilizing the microcontroller and data derived from received RFID signals, the steering of the antennas 34 allows the smart passive RFID reader 10 to adapt to the propagation environment by providing beamforming optimization based on received signal strength, thus further improving the communication with passive RFID tags.

Alternate embodiments of the present invention include the use of more than two antennas.

Additional alternate embodiments of the present invention include mechanically steering antennas in more than a single direction.

In the above description of the Smart Passive RFID Reader with Adaptive Beamforming Capability of this invention, various configurations are described and applications thereof in corresponding systems are provided. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A smart passive RFID reader comprising:
   a means for powering said smart passive RFID reader;
   said means for powering selected from the group consisting of an AC power input, at least one DC voltage converter, at least one DC-DC converter, at least one uninterruptible power supply (UPS) controller, and at least one battery;
   an RFID reader configured to send and receive signals from passive RFID tags;
   a plurality of antennas connected to said RFID reader;
   said antennas each having a primary antenna plane;
   said antennas each having a pivoting axis proximate said antenna and substantially parallel to said antenna plane;
   at least two of said antennas being adjacent, with said pivoting axes being parallel;
   said adjacent antennas having orthogonal polarization with respect to one another;
   said adjacent antennas each having a beam radiation pattern; and
   whereby rotating said antennas about said pivoting axes causes a change in the overlap of said beam radiation patterns and thereby provides a means for adaptive beamforming in order to improve tag reading.

2. The smart passive RFID reader of claim 1, wherein said pivoting axis is proximate one edge of said antenna.

3. The smart passive RFID reader of claim 1, wherein said pivoting axes are in mutual proximity.

4. The smart passive RFID reader of claim 1, wherein each of said pivoting axes have a pivot angle range of approximately 0 to 15 degrees.

5. The smart passive RFID reader of claim 1, further comprising:
   a plurality of antenna mounting frames;
   each of said antennas being fastened to one of said antenna mounting frames;
   a substrate frame; and
   each of said pivoting axes being fastened between one of said antenna mounting frames and said substrate frame, whereby said antennas may be rotated to be parallel to said substrate frame or rotated to be angled relative to each other and to said substrate frame.

6. The smart passive RFID reader of claim 1, wherein:
said means for powering includes an AC power inlet, at least one DC voltage converter, at least one backup battery, and at least one UPS controller;
said DC voltage converter being in electrical communication with said AC power inlet;
said DC voltage converter being in electrical communication with said UPS controller;
said backup battery being in electrical communication with said UPS controller; and
said RFID reader being in electrical communication with said UPS controller.

7. The smart passive RFID reader of claim 6, wherein said means for powering further includes a mode switch;
said mode switch having a first, a second, and a third mode;
said first mode powering said smart passive RFID reader exclusively from said DC voltage converter and said AC power inlet;
said second mode powering said smart passive RFID reader from said DC voltage converter and said AC power inlet, with UPS-controlled battery backup in the event of the loss of AC power;
said second mode further providing recharging to said battery; and
said third mode powering said smart passive RFID reader exclusively from said battery.

8. The smart passive RFID reader of claim 1, further comprising:
a microcontroller providing functions selected from the group consisting of an embedded computing platform within said smart passive RFID reader, parsing RFID reader tag detection messages, encrypted transmission of data, decryption of received data, encrypted authentication of tag messages, signal processing, database integration, networking capability on RFID reader data, user interface, and diagnostics messages; and
whereby said microcontroller provides a means for increasing the probability of detecting correct passive RFID tags and decreasing the probability of detecting incorrect passive RFID tags.

9. The smart passive RFID reader of claim 8, further comprising:
an internal network including least one Ethernet switch having a plurality of Ethernet ports; and
said internal network providing high-level data connectivity between said microcontroller, said RFID reader, and user devices external to said smart passive RFID reader.

10. The smart passive RFID reader of claim 9, further comprising a network reboot controller connected to said internal network; and
said network reboot controller configured to accept reboot commands from user devices external to said smart passive RFID reader and perform power-cycling rebooting upon said microcontroller and said RFID reader.

11. The smart passive RFID reader of claim 10, further comprising:
an Ethernet jack configured for connection to user devices external to said smart passive RFID reader;
wherein said at least one Ethernet switch comprises at least a first Ethernet switch and a second Ethernet switch;
said first Ethernet switch being connected to said network reboot controller, said second Ethernet switch, and said Ethernet jack;
said second Ethernet switch being connected to said first Ethernet switch, said RFID reader, and said microcontroller; and
said network reboot controller additionally configured to perform power-cycle rebooting upon said second Ethernet switch.

12. The smart passive RFID reader of claim 11, further comprising:
a USB jack configured for connection to user devices external to said smart passive RFID reader;
an HDMI jack configured for connection to user devices external to said smart passive RFID reader; and
said USB jack and said HDMI jack being connected to said microcontroller.

13. The smart passive RFID reader of claim 5, further comprising an enclosure at least partially enclosing said antennas, said antenna frames, and said substrate frame.

14. The smart passive RFID reader of claim 13, wherein said enclosure at least partially encloses said means for powering and said RFID reader.

15. The smart passive RFID reader of claim 13, further comprising;
a plurality of mechanical linkages;
each of said mechanical linkages being operatively engaged between a portion of one of said antenna frames and a portion of said enclosure;
said mechanical linkages each including a means for locking;
said mechanical linkages being manually actuatable; and
whereby each of said antennas may be rotated or locked in position by manually actuating the operatively engaged one of said mechanical linkages.

16. The smart passive RFID reader of claim 13, further comprising:
a plurality of electromechanical actuators, each operatively engaged with one of said antennas;
a microcontroller providing functions selected from the group consisting of an embedded computing platform within said smart passive RFID reader, parsing RFID reader tag detection messages, encrypted transmission of data, decryption of received data, encrypted authentication of tag messages, signal processing, database integration, networking capability on RFID reader data, user interface, actuator control, and diagnostics messages;
said microcontroller thereby providing a means for increasing the probability of detecting correct passive RFID tags and decreasing the probability of detecting incorrect passive RFID tags;
said actuators being in electronic communication with and under control of said microcontroller; and
whereby each of said antennas may be rotated to or held in a specific angular position by one of said actuators.

17. A smart passive RFID reader comprising:
a means for powering said smart passive RFID reader including an AC power inlet, at least one DC voltage converter, at least one backup battery, and at least one uninterruptible power supply (UPS) controller;
an RFID reader configured to send and receive signals from passive RFID tags;
said DC voltage converter being in electrical communication with said AC power inlet;
said DC voltage converter being in electrical communication with said UPS controller;

said backup battery being in electrical communication with said UPS controller;
said RFID reader being in electrical communication with said UPS controller;
a plurality of antennas connected to said RFID reader;
said antennas each having a primary antenna plane;
said antennas each having a pivoting axis proximate said antenna and substantially parallel to said antenna plane;
at least two of said antennas being adjacent, with said pivoting axes being parallel;
said pivoting axes being in mutual proximity;
said adjacent antennas having orthogonal polarization with respect to one another;
a microcontroller providing functions selected from the group consisting of an embedded computing platform within said smart passive RFID reader, parsing RFID reader tag detection messages, encrypted transmission of data, decryption of received data, encrypted authentication of tag messages, signal processing, database integration, networking capability on RFID reader data, user interface, and diagnostics messages;
said microcontroller thereby providing a means for increasing the probability of detecting correct passive RFID tags and decreasing the probability of detecting incorrect passive RFID tags;
an internal network including at least one Ethernet switch having a plurality of Ethernet ports;
said internal network providing high-level data connectivity between said microcontroller, said RFID reader, and user devices external to said smart passive RFID reader;
a network reboot controller connected to said internal network;
said network reboot controller configured to accept reboot commands from user devices external to said smart passive RFID reader and perform power-cycling rebooting upon said microcontroller and said RFID reader;
an Ethernet jack configured for connection to user devices external to said smart passive RFID reader;
said Ethernet switch being connected to said Ethernet jack, said network reboot controller, said RFID reader, and said microcontroller;
said adjacent antennas each having a beam radiation pattern; and
whereby rotating said antennas about said pivoting axes causes a change in the overlap of said beam radiation patterns and thereby provides a means for adaptive beamforming in order to improve tag reading.

18. The smart passive RFID reader of claim 17, further comprising:
a mode switch having a first, a second, and a third mode;
said first mode powering said smart passive RFID reader exclusively from said DC voltage converter and said AC power inlet;
said second mode powering said smart passive RFID reader from said DC voltage converter and said AC power inlet with UPS-controlled battery backup in the event of the loss of AC power;
said second mode further providing recharging to said battery; and
said third mode powering said smart passive RFID reader exclusively from said battery.

19. The smart passive RFID reader of claim 17, further comprising:
said at least one Ethernet switch comprising at least a first Ethernet switch and a second Ethernet switch, each having a plurality of Ethernet ports;
said first Ethernet switch being connected to said network reboot controller, said second Ethernet switch, and said Ethernet jack;
said second Ethernet switch being connected to said first Ethernet switch, said RFID reader, and said microcontroller; and
said network reboot controller additionally configured to perform power-cycle rebooting upon said second Ethernet switch.

20. The smart passive RFID reader of claim 17, wherein each of said pivoting axes has a pivot angle range of approximately 0 to 15 degrees.

21. The smart passive RFID reader of claim 17, further comprising:
a plurality of antenna mounting frames;
each of said antennas being fastened to one of said antenna mounting frames;
a substrate frame; and
wherein each of said pivoting axes is fastened between said antenna mounting frames and said substrate frame, whereby said antennas may rotated to be parallel to said substrate frame or rotated to be angled relative to each other and to said substrate frame.

22. The smart passive RFID reader of claim 21, further comprising an enclosure at least partially enclosing said antennas, said antenna frames, said substrate frame, said RFID reader, said means for powering said smart passive RFID reader, said RFID reader, said mode switch, said microcontroller, said internal network, said network reboot controller, and said Ethernet jack.

23. The smart passive RFID reader of claim 22, further comprising;
a plurality of mechanical linkages, each operatively engaged between a portion of one of said antenna frames and a portion of said enclosure;
said mechanical linkages each including a means for locking;
said mechanical linkages being manually actuatable; and
whereby each of said antennas may be rotated or locked in position by manually actuating the operatively engaged one of said mechanical linkages.

24. The smart passive RFID reader of claim 22, further comprising:
a plurality of electromechanical actuators, each operatively engaged with one of said antennas;
said actuators being in electronic communication with and under control of said microcontroller; and
whereby each of said antennas may be rotated to or held in a specific angular position by one of said actuators.

25. A smart passive RFID reader comprising:
a means for powering said smart passive RFID reader including an AC power inlet and at least one DC voltage converter;
said DC voltage converter being in electrical communication with said AC power inlet;
an RFID reader configured to send and receive signals from passive RFID tags;
a plurality of antennas connected to said RFID reader;
said antennas each having a primary antenna plane;
said antennas each having a pivoting axis proximate said antenna and substantially parallel to said antenna plane;
at least two of said antennas being adjacent, with said pivoting axes being parallel;
said pivoting axes being in mutual proximity;

said adjacent antennas having orthogonal polarization with respect to one another;
a microcontroller providing functions selected from the group consisting of an embedded computing platform within said smart passive RFID reader, parsing RFID reader tag detection messages, encrypted transmission of data, decryption of received data, encrypted authentication of tag messages, signal processing, database integration, networking capability on RFID reader data, user interface, and diagnostics messages;
said microcontroller thereby providing a means for increasing the probability of detecting correct passive RFID tags and decreasing the probability of detecting incorrect passive RFID tags;
an internal network including at least one Ethernet switch having a plurality of Ethernet ports;
said internal network providing high-level data connectivity between said microcontroller, said RFID reader, and user devices external to said smart passive RFID reader;
a network reboot controller connected to said internal network;
said network reboot controller configured to accept reboot commands from user devices external to said smart passive RFID reader and perform power-cycling rebooting upon said microcontroller and said RFID reader;
an Ethernet jack configured for connection to user devices external to said smart passive RFID reader;
said Ethernet switch being connected to said Ethernet jack, said network reboot controller, said RFID reader, and said microcontroller;
said adjacent antennas each having a beam radiation pattern; and
whereby rotating said antennas about said pivoting axes causes a change in the overlap of said beam radiation patterns and thereby provides a means for adaptive beamforming in order to improve tag reading.

26. A smart passive RFID reader comprising:
an RFID reader configured to send and receive signals from passive RFID tags;
a microcontroller providing functions selected from the group consisting of an embedded computing platform within said smart passive RFID reader, parsing RFID reader tag detection messages, encrypted transmission of data, decryption of received data, encrypted authentication of tag messages, signal processing, database integration, networking capability on RFID reader data, user interface, and diagnostics messages;
said microcontroller thereby providing a means for increasing the probability of detecting correct passive RFID tags and decreasing the probability of detecting incorrect passive RFID tags;
a means for powering said RFID reader and said microcontroller;
said means for powering selected from the group consisting of an AC power input, at least one DC voltage converter, at least one DC-DC converter, at least one uninterruptible power supply (UPS) controller, and at least one battery;
a plurality of antennas connected to said RFID reader;
said antennas each having a primary antenna plane;
said antennas each having a pivoting axis proximate said antenna and substantially parallel to said antenna plane;
at least two of said antennas being adjacent, with said pivoting axes being parallel;
said adjacent antennas having orthogonal polarization with respect to one another;
said adjacent antennas each having a beam radiation pattern; and
whereby rotating said antennas about said pivoting axes causes a change in the overlap of said beam radiation patterns and thereby provides a means for adaptive beamforming in order to improve tag reading.

* * * * *